Patented Mar. 25, 1924.

1,488,386

UNITED STATES PATENT OFFICE.

EDOUARD PERCY CRANWILL GIROUARD AND FREDERICK WILLIAM SALISBURY-JONES, OF LONDON, ENGLAND.

REDUCTION OF ORES.

No Drawing. Application filed August 11, 1923. Serial No. 656,904.

*To all whom it may concern:*

Be it known that we, Sir EDOUARD PERCY CRANWILL GIROUARD and FREDERICK WILLIAM SALISBURY-JONES, subjects of the King of Great Britain and Ireland, residing, respectively, at 1 St. James's Street, London, S. W. 1, England, and 14/16 Cockspur Street, London, S. W. 1, England, have invented certain new and useful Improvements Relating to the Reduction of Ores, of which the following is a specification.

This invention relates to the reduction of ores and more especially to an improved method for the preparation of the charge of fuel, flux and ore, whereby the process of reduction is rendered more effective and efficient, such preparation consisting in the preliminary admixture of the ore and fuel or of the ore, fuel and flux, and in subjecting this mixture to a coking process at low or moderate temperature.

According to the invention, in carrying out the coking process, an admixture of finely divided ore and fuel, or of ore, fuel and flux, together with any other re-agent is subjected to distillation under such conditions that the distillation is arrested at the stage after the greater part or the whole or almost the whole of the tar has been removed and while the residue contains a substantial proportion of volatile hydrocarbon.

According to the invention, moreover, the conditions under which distillation is effected are advantageously such that the temperature in the later stages of the distillation reaches to about 800° C.

According to the invention also a part of the fuel required in the charge for complete reduction of the ore may be introduced into the reduction furnace in the condition of powder with the blast or by means of a blast.

By the preliminary treatment according to the invention a hard agglomerated residue results from the distillation which is available as a charge for reduction without any necessary addition thereto and the process of reduction is then effected in a manner which is substantially the same as that which is usual.

In carrying the invention into effect in the reduction of iron ore, and in the preparation of a charge of fuel, flux and ore for a blast furnace, the ore to be used is reduced to a fine condition by grinding in a ball or other suitable mill, and in this condition the gangue may be removed, and the ore concentrated by known means.

The quantity of limestone or other flux or fluxes required, according to the character of the ore to be used, may also be similarly reduced to a fine condition before admixture with the ore.

The fuel employed is a coking or binding coal or a mixture of coals that will coke under the conditions of carbonization at low or moderate temperatures to which the mixture is then subjected, and this fuel is reduced into a fine condition.

The ore, fuel and flux in the proportions determined according to the character of the ore, and reduced to a substantially uniform condition of fineness are intimately mixed, and the mixture is charged into a retort in which it is coked or carbonized at low or moderate temperatures, for example from 350° C. and under such conditions that the ore and fuel are reduced to a substantially uniform condition of fineness and subjected to distillation which in its later stages reaches to about 800° C. and the further condition that the distillation is arrested at the stage after the greater part or the whole or almost the whole of the tar has been removed from the charge and while the residue contains a substantial proportion of volatile hydrocarbons, such residue being a hard and dense coked mass.

By such means vapours and gas are produced, and thus the distillates and gas contribute to the economy of the process.

The coked mass or agglomerate produced may on discharge from the retort be directly passed to the furnace for reduction, thus avoiding waste of heat.

It will be understood that reduction of the parts of the charge to a finely divided condition has for its object to ensure intimate admixture, but, according to the requirements in particular cases, the respective parts of the charge may be used in a coarse condition. It will, however, be understood that the proportion and character of the fuel used is such that a hard coke is produced. Thus the temperature and extent of the distillation are determined accordingly.

The agglomerated residue may, moreover be produced in an especially hard condition and a partial or substantial reduction of the ore to metal be simultaneously effected.

There may be added to the charge any other re-agent that in particular cases may be required, which may be incorporated as a solid in the grinding of one of the parts of the charge, or in the final stage of grinding and intermixture of the whole charge.

By such preparation of a blast furnace charge, the limestone, when used as the flux, is calcined, and is uniformly distributed in the charge.

The total amount of fuel necessary for the purpose of complete reduction of the ore need not be introduced into the blast furnace wholly with the charge, but instead part of the fuel may be introduced with the blast, in the condition of powder, in a manner similar to that in which powdered fuel is admitted to heating furnaces, the powdered fuel being conveyed to the blast furnace in pipes. The primary supply of air may be used to spray the powdered fuel, and the mixed blast of fuel and primary air may be passed through a nozzle, through which the secondary air may be directed.

Any other means may be provided for feeding the powdered fuel, and for mixing the fuel with the air blast.

A separate blast of air is advantageously provided for the powdered fuel, and the blasts of air and fuel are admitted at the boshes in a suitable position, while the position of the usual air blast nozzles is not necessarily affected.

The powdered fuel used is produced according to the method described in the co-pending application No. 560,711 of 1922.

A satisfactory reduction of Cumberland iron ore has been effected after concentration by subjecting a charge to a coking operation in the following proportions:

42 per cent of ore.
53 per cent of coking coal.
5 per cent of lime.

The ore and fuel were reduced to a substantially uniform condition of fineness such that the whole passed through a coarse screen, for example of from 6 to 10 meshes to the linear inch and afterwards coked under such conditions that the later stages of the distillation were carried out at a temperature in the charge of 800° C. The lime was added in the form of limestone. The duration of the distillation was determined by the greater part of the tar having been distilled from the charge while the residue had a substantial content of volatile hydrocarbons.

By such a preliminary treatment the complete reduction of the ore to metal can be expeditiously effected and a charge for smelting produced which requires no necessary additions. Moreover the fuel produced was in an especially hard condition suitable for supporting the burden in the blast furnace. Moreover the fuel had a substantial content of volatile hydrocarbons and had a substantially higher calorific value than the metallurgical coke such as usually employed.

The invention comprises the conditions involved in the production of such an agglomerated residue and no limitation is involved to the particular temperature above indicated but it is one of the objects of the invention to effect the distillation so that in the later stages of the distillation the temperature in the charge lies in the neighbourhood of that indicated. Furthermore the invention is not limited to the proportions of ore to fuel or of the flux given in the example. The proportions will vary according to the character of the ore and of the fuel used.

There may be added to the charge any other re-agent that in particular cases may be required such as for combining with any impurity contained in the coal used and the lime added may be in excess of that required for use as a flux.

We claim:—

1. A method for reducing ores comprising a preliminary treatment, consisting in the admixture of the ore and fuel, or of the ore, fuel and flux, together with any other re-agent and the subjection of the mixture to a preliminary coking process at low or moderate temperature, the distillation being arrested at the stage after the greater part or the whole or almost the whole of the tar has been removed from the charge and while the residue contains a substantial proportion of volatile hydrocarbons, substantially as described.

2. A preliminary treatment of ores such as specified in the claim 1, wherein the ore and fuel is reduced to a substantially uniform condition of fineness and is subject to distillation which in the later stages reaches to about 800° C. substantially as described.

EDOUARD PERCY CRANWILL GIROUARD.
FREDERICK WILLIAM SALISBURY-JONES.